United States Patent [19]

Foster

[11] 4,255,179
[45] Mar. 10, 1981

[54] GLASSWARE FORMING MACHINES

[75] Inventor: Thomas V. Foster, Doncaster, England

[73] Assignee: Emhart Industries, Inc., Farmington, Conn.

[21] Appl. No.: 24,646

[22] Filed: Mar. 28, 1979

[30] Foreign Application Priority Data

Apr. 10, 1978 [GB] United Kingdom ............... 13974/78

[51] Int. Cl.³ ............................................ C03B 9/193
[52] U.S. Cl. .......................................... 65/79; 65/64;
65/80; 65/158; 65/230; 65/235; 65/241;
65/260; 65/229
[58] Field of Search .................... 65/64, 79, 80, 158,
65/229, 230, 235, 241, 260

[56] References Cited

U.S. PATENT DOCUMENTS

| 1,911,119 | 5/1933 | Ingle | 65/360 |
|---|---|---|---|
| 1,992,510 | 2/1935 | Smith | 65/64 |
| 2,036,333 | 4/1936 | Howard | 65/241 X |
| 2,075,363 | 3/1937 | Smith | 65/230 |
| 2,084,285 | 6/1937 | Wadman | 65/230 |
| 2,151,876 | 3/1939 | Wadman | 65/230 |
| 3,622,305 | 11/1971 | Becker | 65/229 |
| 3,634,660 | 1/1972 | Moran et al. | 65/158 X |
| 3,644,111 | 2/1972 | Becker | 65/229 |
| 3,914,120 | 10/1975 | Foster | 65/229 |
| 4,010,021 | 3/1977 | Foster | 65/229 |
| 4,043,787 | 8/1977 | Foster | 65/229 X |

FOREIGN PATENT DOCUMENTS 1441099 6/1976 United Kingdom .
1491859 11/1977 United Kingdom .

OTHER PUBLICATIONS

"Stand der Heye Maschinenentwicklung", *Glastechnische Berichte*, Mar. 1975, vol. 48, Issue 3, pp. 43–50.
"The Heye-Maul 1-2 Machine", *Glass Industry*, Oct. 1977, Jack Foyil.

*Primary Examiner*—Arthur D. Kellogg
*Attorney, Agent, or Firm*—H. Samuel Kieser

[57] ABSTRACT

An individual section of a multiple section glassware forming machine has three operating stations in spaced apart relation along the longitudinal center line of the section. A parison formed in the first station is transferred to the second station and released there by a first transfer means. A second transfer means which is operated independently of the first transfer means engages the parison at the second station and moves the parison to a third station in which an article of glassware is formed. By adjusting the time of operation of either transfer means relative to the other, the period of time during which the parison reheats may be changed without altering the relative timing of any of the machine functions which together make up the parison-forming cycle or the relative timing of any of the machine functions which together comprise the glassware forming cycle.

23 Claims, 18 Drawing Figures

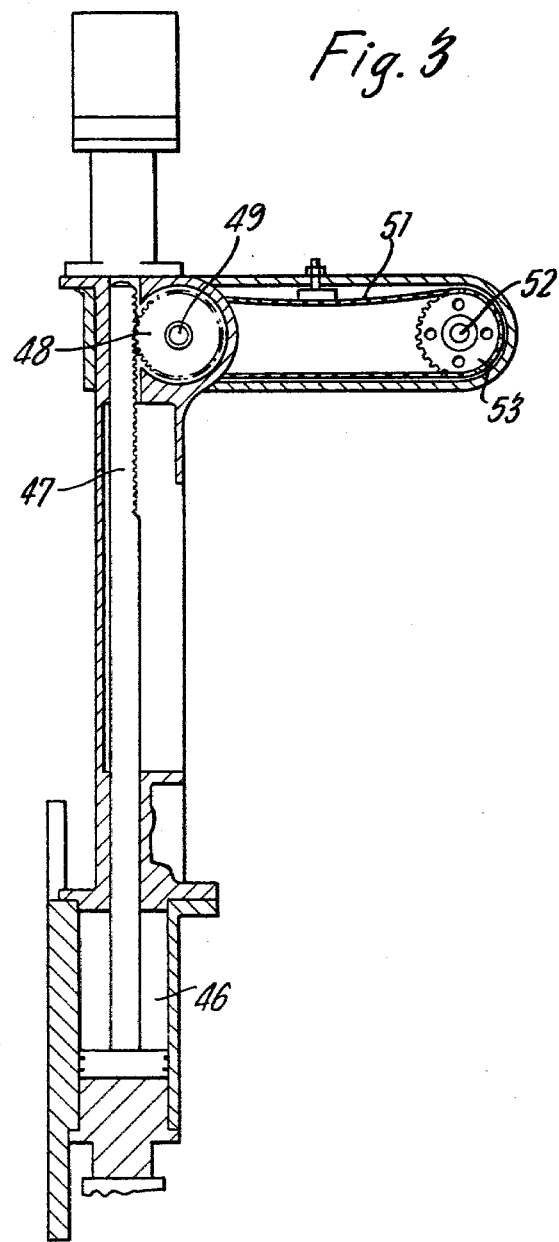

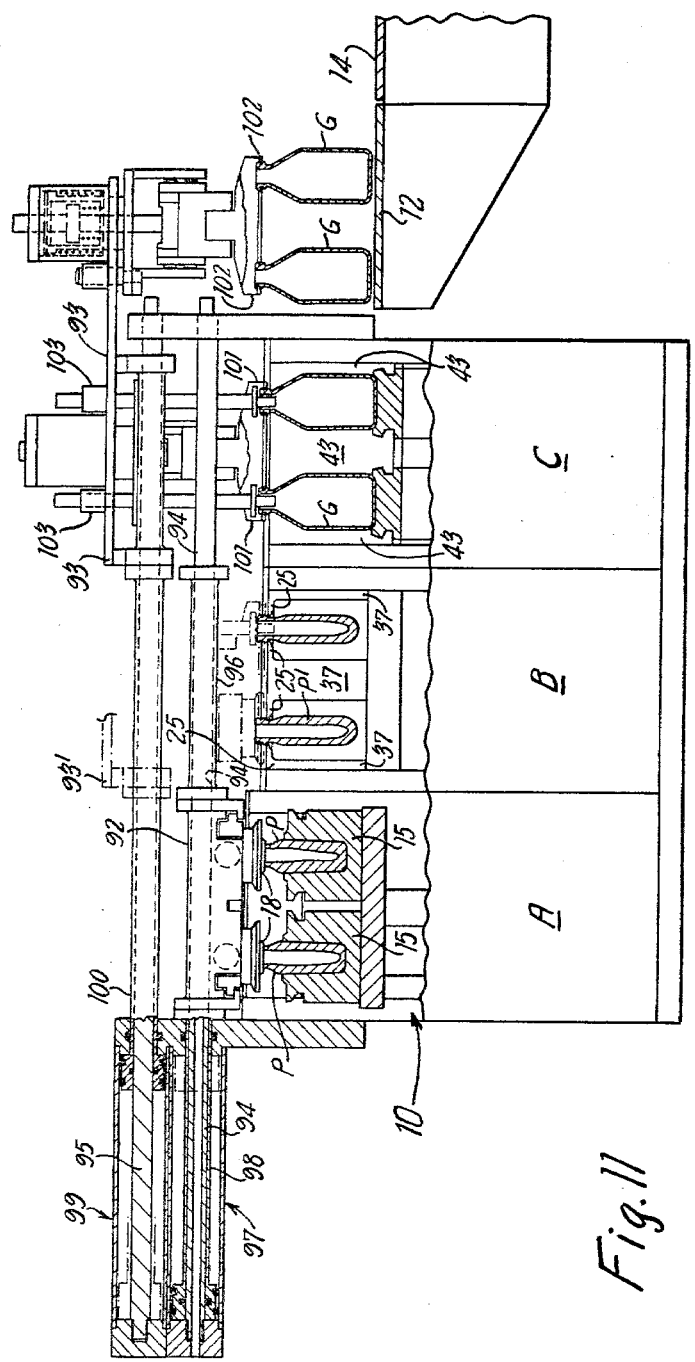

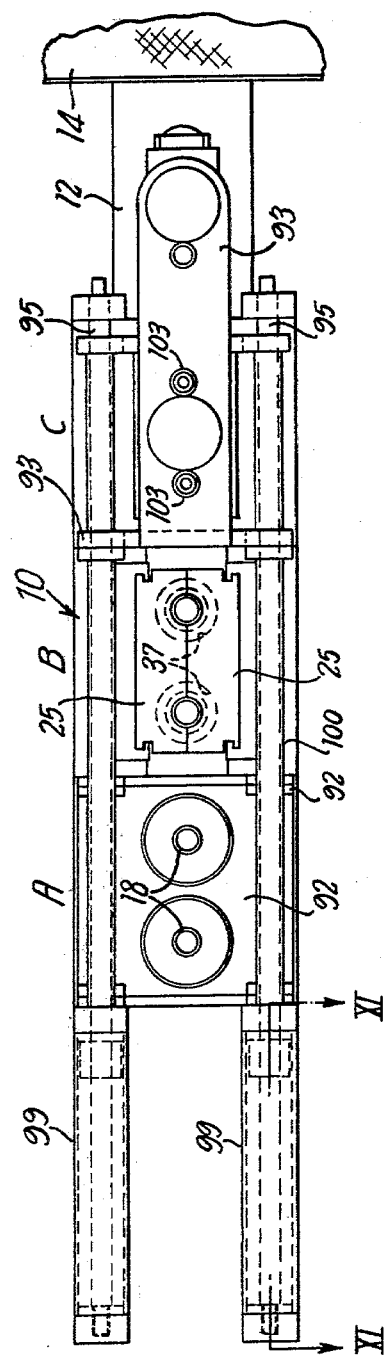

GLASSWARE FORMING MACHINES

CROSS REFERENCES TO RELATED APPLICATIONS

Related inventions form the subject matter of Application Ser. No. 024,826 of David Braithwaite, and Application Ser. No. 024,647 of Frank Alan Fenton, both filed on the same day as the present Application.

BACKGROUND OF THE INVENTION

This invention relates to individual sections of multiple section glassware forming machines and to processes of forming glassware using such machine sections. A multiple section glassware forming machine comprises a plurality of sections arranged in side-by-side relationship, each such section in and of itself comprising a forming machine for converting a gob of molten glass at first into a parison and then into a finally shaped article of glassware. Each section may be designed for either "single gob" or "multiple gob" use—in the latter case each operation in the formation of multiple articles being performed at the same time. Accordingly, each such section includes at least one parison (or blank) mould in which parisons are formed either by pressing or blowing, and at least one final shaping blow mould wherein the parisons are blown into the final shape of the desired article of glassware as the result of the application of a pressure difference between the inside and the outside of the parison which is introduced into the blow mould.

In the conventional individual section glassware forming machine (the I.S. machine) such as shown for example in U.S. Pat. No. 1,911,119, the parison mould is in an inverted position at a first station and a transfer mechanism including a neck ring structure holds the inverted parison at the first station and swings the parison through an arc into an upright position in the blow mould at a second station for final shaping. The neck ring structure then reverts to the first station for subsequent parison formation. The final article of glassware is removed from the blow mould at the second station by a separate and independent takeout means.

The glassware forming process which is performed in the I.S. machine consists essentially of three stages, namely, a parison formation at the first station, a reheating time, and a final shaping of the article of glassware at the second station. The reheating time is the period within which the outer layer of glass which contacted the parison mould is reheated by the heat retained in the other parts of the parison and extends from the time at which the parison mould is opened at the first station until the time at which the final shaping of the article of glassware is commenced at the second station. In practice, for a given cycle time of the I.S. machine, the reheating time in the glassware forming process can be increased only at the expense of the time taken to blow the final article of glassware in the blow mould.

In U.K. Pat. No. 1,491,859 there is described an individual section of a multiple section glassware forming machine which comprises three stations being, respectively, a first station in which a parison is formed by pressing in an upright parison mould, a second station in which the parison is further formed, and a third station in which the final shaping of the article of glassware is effected in a blow mould. The glassware forming machine of U.K. Pat. No. 1,491,859 further comprises a transfer mechanism for parisons and finished articles of glassware which includes a horizontally movable carriage having thereon a neck ring structure and two tong structures. The carriage is reciprocated linearly from one position to another position and back to the said one position between successive parison formations at the first station, with the result that there is simultaneous movement of a parison from the first station to the second station, a further formed parison from the second station to the third station, and an article of glassware from the third station to a take-out position beyond the third station, for example a deadplate. In the process of forming glassware using this machine, adequate reheating time is provided in consequence of the sojourn of the parison at the second station, but there is again little scope for variation of the reheating time which is frequently rather longer than is required at the expense of time which is desired for suspending the finished article after removal from the blow mould at the third station and before being deposited, for example, on a deadplate. This desirable article hanging time (also referred to herein as "deadplate hanging time") can only be provided in the machine of U.K. Pat. No. 1,491,859 at the expense of the time taken to press the parison at the first station.

SUMMARY OF THE INVENTION

According to the present invention there is provided a process of forming glassware from a gob of molten glass in an individual section of a multiple section glassware forming machine, which section has three stations spaced apart longitudinally of the section, wherein a primary cycle comprising the machine functions for forming a parison from the gob of molten glass is performed in the first of said stations, a secondary cycle comprising the machine functions for finally shaping an article of glassware in a blow mould is performed at the third of said stations, the parison is moved from the first station to the second station by a first transfer means, the first transfer means releases the parison at the second station, the first transfer means thereafter returns to the first station and the parison is subsequently moved from the second station to the third station by a second transfer means, and the period elapsing between the time at which the first transfer means brings the parison to the second station and the time at which the second transfer means removes the parison from the second station to the third station is adjustable, thereby enabling the time during which the parison reheats after its formation in the primary cycle and before the formation of the article of glassware in the secondary cycle to be adjusted without altering the relative timing of any of the machine functions comprising the primary cycle or the relative timing of any of the machine functions comprising the secondary cycle.

The process in accordance with the present invention has the advantage over the process performed in the conventional I.S. machine, in that the reheating time of the parison may be increased without increasing the cycle time of the I.S. machine itself, and thus without adversely affecting the rate of production of articles of glassware.

The process in accordance with the present invention has the advantage over the process performed in the machine of U.K. Pat. No. 1,491,859 in that the reheating time is flexible and may be reduced without adversely affecting the time taken to form the parison in the parison mould, or the time taken to form the article of glassware in the blow mould.

Further in accordance with the present invention there is provided apparatus for performing the process in accordance with the present invention as set out above. In its simplest terms such apparatus consists of an individual section of a multiple section glassware forming machine which comprises three operating stations which are, respectively, a first station including a blank mould for forming a parison, a second station in which reheating of a parison takes place, and a third station including a blow mould for finally shaping an article of glassware, and independently operable first and second transfer means, the first transfer means including a neck ring structure and actuating means for moving the neck ring structure from a first position in which the neck ring structure engages a parison in the blank mould at the first station to a second position in which the neck ring structure releases a parison at the second station and returning the neck ring structure from the second position to the first position prior to the formation of the next parison in the blank mould at the first station, and the second transfer means including gripping means and actuating means for moving the gripping means between a first position in which the gripping means engages a parison at the second station and a second position in which the gripping means holds the parison in such a location at the third station that the blow mould at the third station can close around the parison.

Two specific embodiments of apparatus in accordance with the present invention will be described. According to a first of the described embodiments there is provided an individual section of a multiple section glassware forming machine which comprises: at a first station, means including a blank mould for forming a parison in an inverted position from a gob of molten glass delivered to the blank mould at the first station; at a second station, means which is movable to engage and support the parison for further forming and to disengage and release the further formed parison; at a third station, means including a blow mould for finally shaping an article of glassware from the further formed parison; first transfer means including a neck ring structure and actuating means for moving the neck ring structure from a position in which the neck ring structure engages the inverted parison at the first station to a position in which the neck ring structure presents the parison in an upright position at the second station where the parison is released, and returning the neck ring structure to the first station prior to the formation of another parison at the first station; and second transfer means operable independently of the first transfer means, which second transfer means includes actuating means and first and second gripping means which are movable simultaneously between first and second positions by the second transfer actuating means, the first gripping means transferring the further formed parison from the second station to the third station while maintaining the further formed parison in an upright position, and the second gripping means transferring the shaped article from the third station to a take-out position beyond the third station.

According to a second of the described embodiments there is provided an individual section of a multiple section glassware forming machine which comprises means defining three operating stations which are, respectively, a first station including an upright top-opening blank mould for forming a parison, a second station including means which is movable to engage and support the parison during reheating thereof at the second station and to disengage and release the parison, and a third station including a blow mould for finally shaping an article of glassware from the further formed parison, first transfer means comprising horizontal guide means, a carriage movable on the horizontal guide means, first actuating means for moving the carriage relative to the horizontal guide means between first and second positions, and a neck ring structure supported on the carriage for forming part of the top-opening blank mould at the first station in the first position of the carriage and movable to release a parison at the second station in the second position of the carriage, and second transfer means operable independently of the first transfer means, the second transfer means including first and second gripping means and second actuating means for simultaneously moving the first and second gripping means between first positions, in which the first gripping means engages a further formed parison at the second station and the second gripping means engages an article of glassware at the third station, and second positions, in which the first gripping means supports the further formed parison at the third station and the second gripping means supports the shaped article at a take-out position beyond the third station.

Conveniently, the second transfer means includes horizontal guide means extending over at least the second and third stations and the take-out position beyond the third station, and a second carriage movable on the last mentioned horizontal guide means and supporting the first and second gripping means. Alternatively, the horizontal guide means need not extend over all of the second and third stations and the take-out position, provided that the first and second gripping means supported on the carriage are respectively at the second and third stations in their first positions and are respectively at the third station and the take-out position in their second positions.

Still further in accordance with the present invention there is provided an individual section of a multiple section glassware forming machine which comprises three operating stations, apparatus for performing a predetermined series of machine functions which include a group of machine functions arranged in a timed relationship to one another to constitute a primary cycle in which a parison is formed in a blank mould at a first station, and a further group of machine functions arranged in a timed relationship to one another to constitute a secondary cycle in which an article of glassware is finally shaped in a blow mould at a third station, independently operable first and second transfer means, the first transfer means including a neck ring structure and actuating means for moving the neck ring structure from a first position in which the neck ring structure engages a parison in the blank mould at the first station to a second position in which the neck ring structure releases a parison at the second station, and returning the neck ring structure from the second position to the first position prior to the formation of the next parison in the blank mould at the first station, and the second transfer means including gripping means and actuating means for moving the gripping means between a first position in which the gripping means engages a parison at the second station and a second position in which the gripping means holds the parison at the third station in such a location that the blow mould at the third station can close around the parison, and means for varying the time for which the parison is supported in the second station and for simultaneously effecting a corresponding consequential change in the timing of the group of machine functions constituting one of the primary and secondary cycles relative to the other of said cycles.

Conveniently, the means for varying the time for which the parison is supported in the second station and for simultaneously effecting a corresponding consequential change in the timing of the group of machine functions constituting one of the primary and secondary cycles relative to the other of said cycles includes electronic storage means storing operating data representative of the times at which each of the events in both the primary and secondary cycles are to be performed and of the times at which the first transfer means and the second transfer means are to be actuated for movement between the first and second positions of the neck ring structure and the gripping means respectively, and data representative of primary and secondary angles, means for reading the data from the storage means and determining whether the operating data for an event is associated with the primary or secondary angle, means for adding the primary or secondary angle to the operating data for said event and causing the said event to be performed as a result of a comparison with the count in a counter, and means for entering into the storage means data representative of different primary and secondary angles.

BRIEF DESCRIPTION OF THE DRAWINGS

FIG. 3 is a side view of second transfer means of the apparatus of FIGS. 1 and 2, FIG. 11 is a side view in part section of a second embodiment of apparatus in accordance with the present invention having a second transfer carriage shown in an extended position, FIG. 12 is a plan view of the apparatus of FIG. 11.

In the drawings the same or similar parts are designated by like reference numerals.

DETAILED DESCRIPTION

Figure 1:
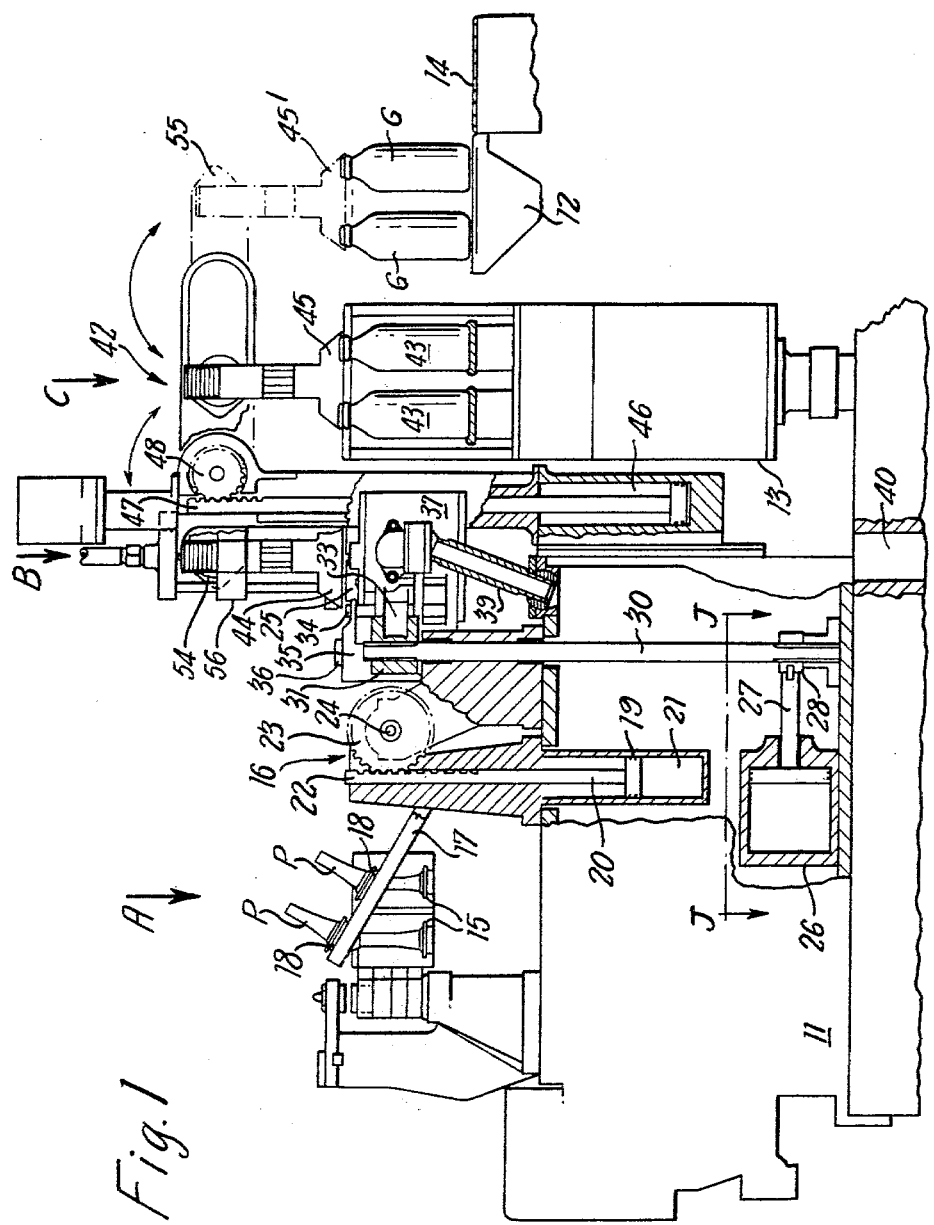
FIG. 1 shows in part section a side view of a first embodiment of apparatus in accordance with the present invention, the part section being taken on the line I—I of FIG. 2.
Figure 2:
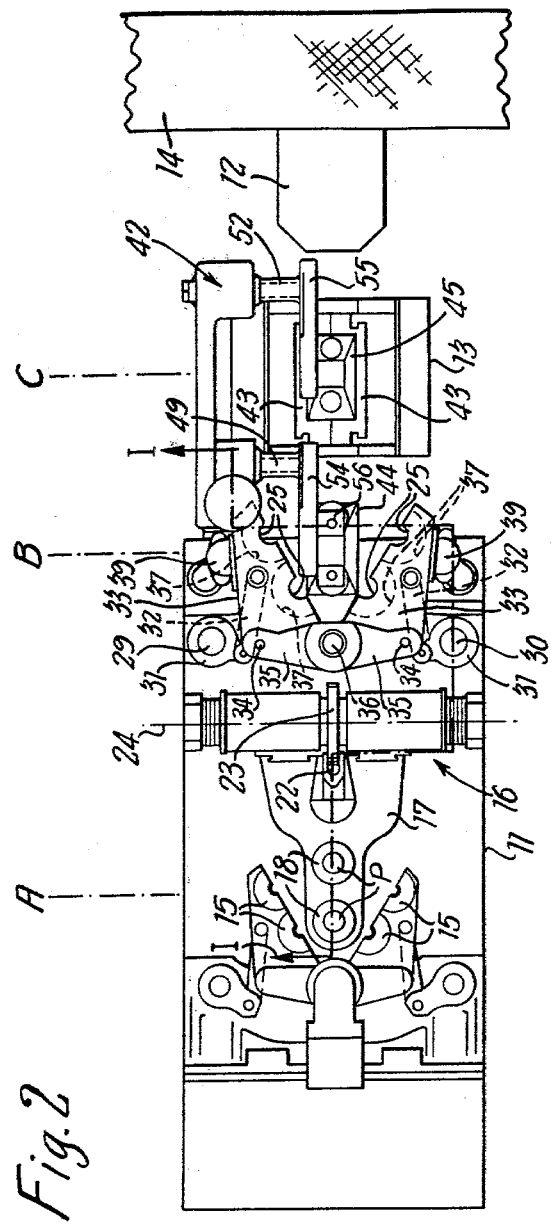
FIG. 2 is a plan view of the apparatus of FIG. 1, but with the first transfer means shown in its first position instead of displaced therefrom as in FIG. 1.

Referring to the accompanying drawings and firstly to FIGS. 1 and 2 there are shown diagrammatically side and plan views of a first embodiment of apparatus according to the present invention which comprises an individual section of a glassware forming machine having three operating stations or areas provided in spaced apart relationship along the longitudinal centre line of the section, these sections being designated generally as a first station A, a second station B and a third station C. The machine section shown is particularly adapted for "double gob" operation wherein a pair of glassware parisons are initially formed at the station A in an inverted position and then transferred to the station B where they are supported for reheating and other further forming as desired, and then transported to the station C for final shaping as articles of glassware such as bottles. When the glassware articles have been finally shaped at station C they are moved out of the machine section on to a deadplate 12, and they are thereafter moved on to a takeaway conveyor 14 where they are placed in line with other similar articles formed by the other individual sections of the forming machine.

The mechanism for forming the parisons in an inverted position at station A may be any well known mechanism for forming a parison by either pressing or blowing as in the conventional I.S. machine. The parison-forming apparatus at station A may be, for example, either the apparatus described in U.S. Pat. No. 1,911,119 for forming a parison at a parison-forming or blank station by blowing, or the apparatus described in U.S. Pat. No. 2,508,890 for forming a parison by pressing. Parison or blank moulds 15 are shown in FIG. 1 but the remainder of the parison-forming apparatus is not illustrated in detail in the accompanying drawings.

When the parisons have been formed at station A and the blank moulds 15, 15 have been opened, a first transfer means indicated generally by the reference numeral 16 is operated to move the parisons P, P, from the inverted positions in which they were formed at station A to station B. The first transfer means 16 includes an arm 17, which carries a pair of neck rings 18, 18, and an actuating means 19 (FIG. 1) which comprises a device having a piston 20 and a cylinder 21, a rack 22 FIGS. 1 and 2) on the piston 20, the rack 22 being engageable with a gear 23 rotatable about an axis 24 to rotate the arm 17 from the position shown to a position at which the parisons held in the neck rings 18, 18 are presented to support jaws 25, 25 at station B. This operation of the first transfer means 16 causes the parisons to be inverted from the upside down positions in which they were formed at station A to upright positions at station B.

Figure 1A:
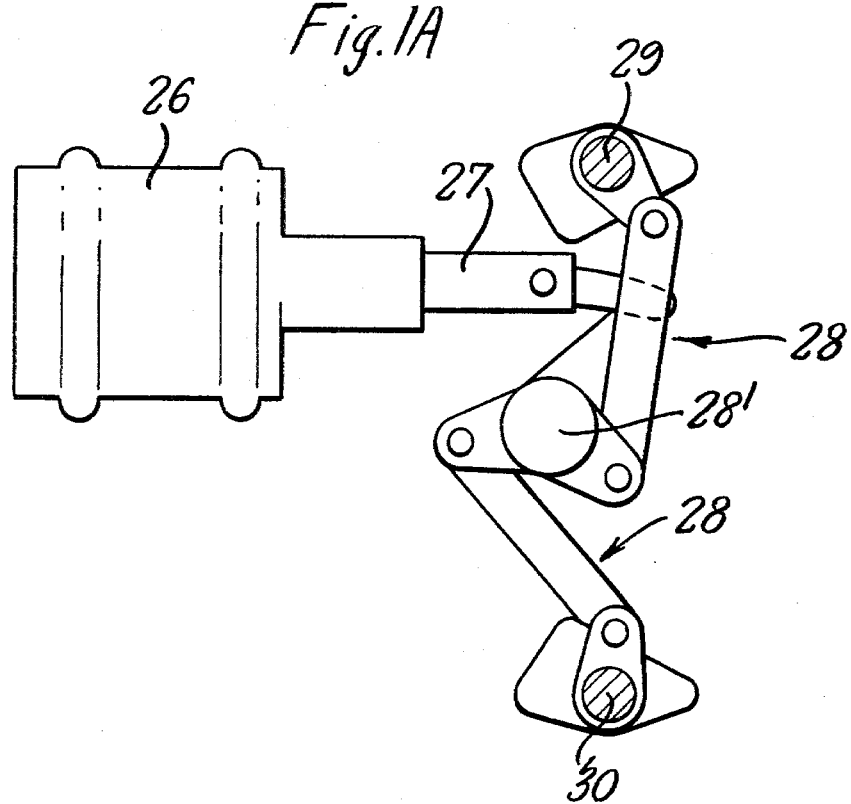
FIG. 1A is a view of part of the apparatus of FIG. 1 taken along the line J—J of FIG. 1.

When the arm 17 of the first transfer means 16 reaches a horizontal position in which the parisons P, P are held substantially vertically at station B, a piston and cylinder device 26 (FIG. 1) is actuated so that its piston 27 is moved from right to left from the position shown, thereby moving horizontal linkages 28 (FIG. 1A) pivoted at 28' and attached to vertical shafts 29 and 30 (FIGS. 1, 1A and 2) so that shaft 29 is moved anti-clockwise about its vertical axis and shaft 30 is moved clockwise about its vertical axis.

As illustrated in FIG. 1 the linkages 28 interconnecting the vertical shafts 29 and 30 with the piston 27 are fixed to the respective vertical shaft 29 or 30 at a low level, and each of the vertical shafts 29 and 30 also carries a link 31 fixed near its upper end. The links 31 are connected through respective further links 32 to arms 33, each of which carries half of each of the support jaws 25, 25. Each of the arms 33 is itself pivotally mounted at 34 to a further arm 35 for rotational movement about a central vertical shaft member 36 (FIG. 2). Consequently, the movement of the piston 27 to the left as seen in FIG. 1 and the consequential opposite rotations imparted to the vertical shafts 29 and 30 causes the support jaws 25, 25 to close, thereby engaging and supporting the parisons P, P immediately after their arrival at station B.

When the parisons P, P are supported by the jaws 25, 25, the neck rings 18, 18 of the first transfer means 16 are opened and the first transfer means 16 reverts to the position shown in FIG. 1 at station A, with closing of the neck rings 18, 18 to form part of the blank or parison moulds 15, 15 at station A for forming of subsequent parisons from the next pair of gobs of molten glass loaded to the blank or parison moulds 15, 15 at station A.

In addition to carrying half of each of the support jaws 25, 25 the arms 33 carry halves of shrouds 37, 37 which, when the arms 33 have been moved so that the support jaws 25, 25 support the parisons P, P at station B, each completely surrounds one of the parisons. Each parison P is thus protected from radiation from the other parison P and also from extraneous unwanted cooling effects. However, if desired, cooling wind can be admitted through the shrouds 37, 37 to cool the parisons P, P selectively and in a controlled manner so that the stretching (run) of the parisons during reheating at station B is influenced to produce a specially desired shape of parison for loading to the blow mould at station C. Alternatively, or additionally, chemical treatments, for example coating with tin, can be undertaken at station B by admitting a suitable chemical through the shrouds 37, 37, for example to influence the surface characteristics such as the surface strength of the parisons. Referring to FIGS. 1 and 2 a tube 39 is shown permitting the introduction of cooling air or coating vapour to parisons within the volume enclosed by the shrouds 37, 37.

As shown in FIG. 1 the bottom of station B is formed with a chute 40 providing a means for removal of cullet rejected from station B.

A second transfer means indicated generally at 42 is provided for effecting simultaneous arcuate movement of the parisons P, P from station B into open blow moulds 43, 43 at station C and of articles of glassware G, G from the open blow moulds 43, 43 to a take-out position over the deadplate 12. The apparatus at station C preferably comprises a blow mould mechanism substantially as described with reference to FIG. 8 of U.K. Pat. No. 1,491,859 which corresponds to U.S. Pat. No. 4,009,016.

The second transfer means 42 includes first take-out tongs 44 and second take-out tongs 45 which constitute first and second gripping means. Each of the first and second take-out tongs comprise two pairs of tongs for gripping two parisons or two articles of glassware G, G (as indicated for the second position of the second take-out tongs 45 indicated at 45' in FIG. 1).

The operation of the second transfer means 42 will now be described with particular reference to FIGS. 3 and 4. The second transfer means 42 includes actuating means constituted by a piston and cylinder assembly 46, the piston of which is formed integrally with a rack 47 which engages with a gear 48 mounted on a shaft 49. Also mounted on shaft 49 is a further gear (hidden in both FIGS. 3 and 4) which engages a sprocket chain 51. When the shaft 49 is rotated by a movement of the piston of the piston and cylinder assembly 46 transmitted to the shaft 49 through the rack 47 and gear 48, the sprocket chain 51 communicates this rotational movement to a parallel shaft 52 through a gear 53 mounted on the shaft 52. The shafts 49 and 52 therefore move simultaneously and through identical angles of rotation.

Figure 4:
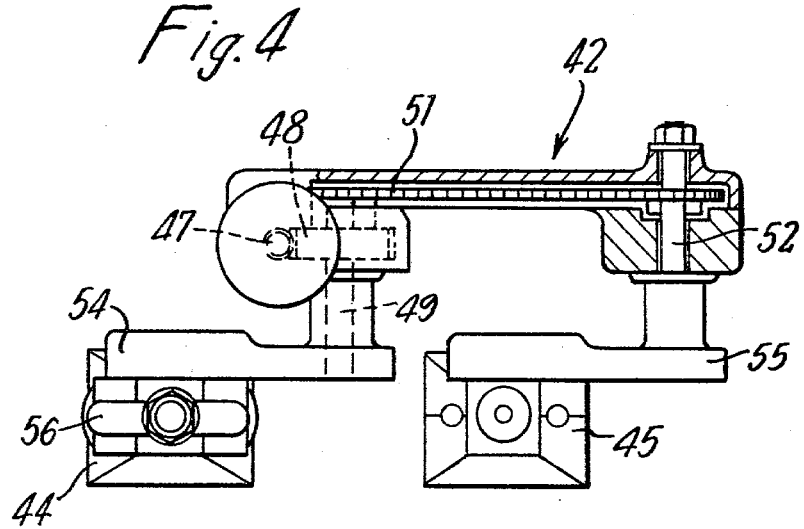
FIG. 4 is a plan view of the second transfer means of FIG. 3.

The shafts 49 and 52 carry, respectively, a first tong arm 54 and a second tong arm 55 (FIGS. 1, 2 and 4). The first tong arm 54 carries the first take-out tongs 44 and a blowhead 56 (as shown in FIG. 1), while the second tong arm 55 carries the second take-out tongs 45.

When the parisons are to be moved from station B where they have been allowed to reheat and have optionally been subjected to other further forming, the first tongs 44 are closed about an upper bead of a double bead finish on the parisons, and the support jaws 25, 25 (FIG. 2) are opened. The second transfer means 42 is then actuated by its piston and cylinder assembly 46 so that the first take-out tongs 44 are moved in an arcuate movement, by rotation of the shaft 49, from station B to station C where blow moulds 43, 43 close about the parisons and grip them preparatory to final shaping of the articles of glassware G, G. The blowhead 56 which is mounted on the first tong arm 54 is lowered into position to deliver air to the interior of the parisons P, P after the actuation of the second transfer means 42 to transfer the parisons P, P from station B to station C, either simultaneously with the closing of the blow moulds or immediately thereafter.

As an alternative to the blowhead 56 being mounted on the second transfer means 42 and movable between station B and station C with the first take-out tongs 44, a conventional blowhead mechanism, for example as described in U.S. Pat. No. 1,911,119 may be mounted permanently at station C.

In FIGS. 5 to 8 there is illustrated an alternative form of second transfer means for use in the first embodiment of the invention in place of the second transfer means 42. The second transfer means of FIGS. 5 to 8 is designated generally by the reference numeral 60, but the full actuating means which forms part of the second transfer means 60 is illustrated only in FIG. 8. Similarly to the second transfer means 42, the second transfer means 60 effects simultaneous movement of the parisons P, P from station B into open blow moulds 43, 43 at station C, and of articles of glassware G, G from the open blow moulds 43, 43 to a take-out position over the deadplate 12.

Figure 5:
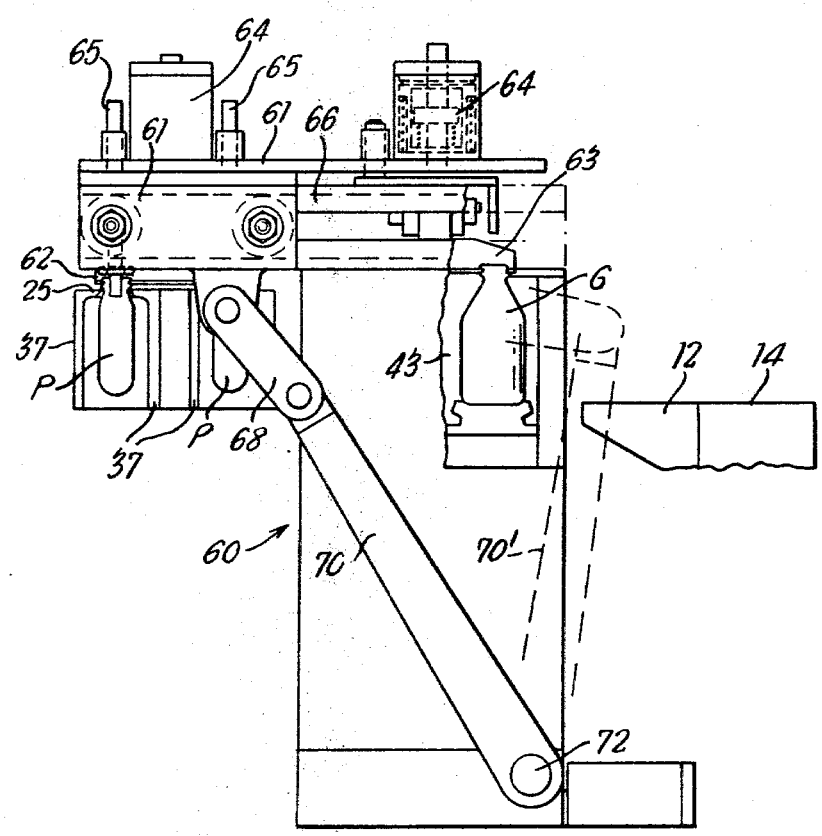
FIG. 5 is a side view of an alternative form of second transfer means for use in the first embodiment of apparatus in accordance with the present invention.
Figure 6:
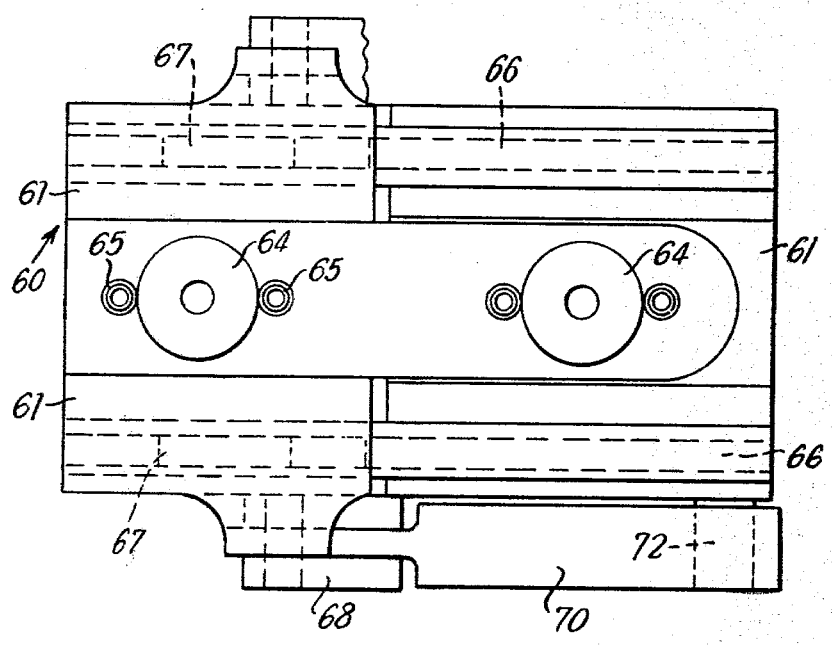
FIG. 6 is a plan view of the second transfer means of FIG. 5.
Figure 7:
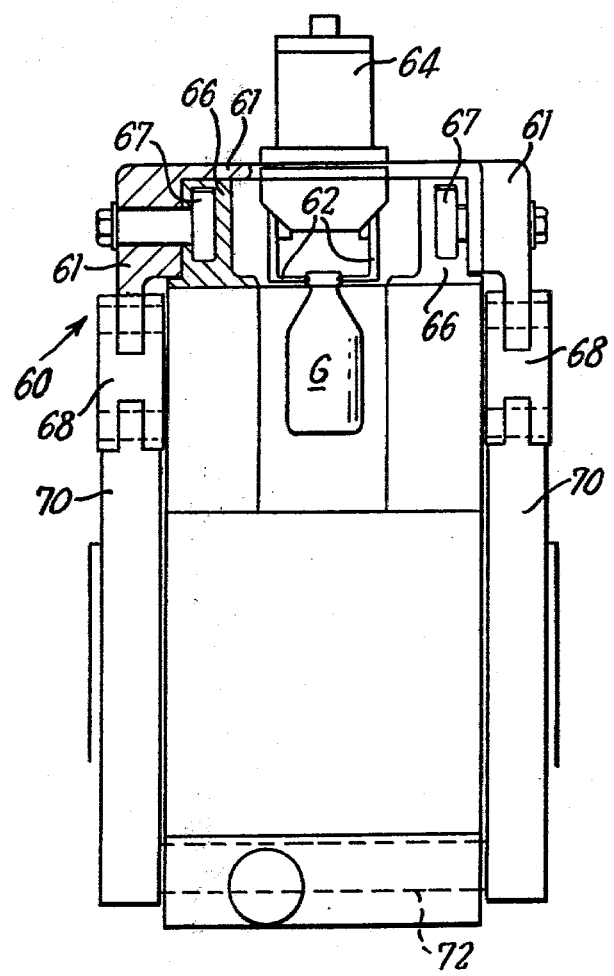
FIG. 7 is an end view of the second transfer means of FIG. 5 looking from the right in that Figure.

The second transfer means 60 comprises a transfer carriage 61 which supports a first pair of take-out tongs 62 and a second pair of take-out tongs 63 which respectively constitute first and second gripping means (only one of the tongs in each pair of take-out tongs is illustrated in FIG. 5). Tong operating mechanisms 64, 64 for the first and second take-out tongs 62, 63 are also mounted on the transfer carriage 61, the tong operating mechanism 64 for the first take-out tongs 62 being associated with a pair of blowheads illustrated at 65, 65 for supplying air to the interiors of the parisons P, P as these are shaped into articles of glassware G, G in the blow moulds 43, 43 at station C.

In the position of FIG. 5 the first pair of take-out tongs 62 are at station B and the second pair of take-out tongs 63 are at station C.

The transfer carriage 61 of the second transfer means 60 is reciprocable along horizontal guide rails 66, 66 between a first position at which the first gripping means (tongs 62) may engage parisons in support jaws 25, 25 at station B, and second gripping means (tongs 63) engages articles of glassware G, G at station C, and a second position at which the first gripping means locates the parisons P, P at station C for engagement by the blow moulds 43, 43 of station C and the second gripping means supports the articles of glassware G, G over the deadplate 12.

Guide rails 66 are provided for engaging with wheels 67, 67 carried by the transfer carriage 61, the wheels 67, 67 being rotatable in a vertical plate. The wheels 67, 67 run within parallel guide rails 66 which constitute one embodiment of horizontal guide means along which the transfer carriage 61 is reciprocated. The transfer carriage 61 which is formed essentially of a horizontal portion (which carries the first and second take-out tongs 62 and 63, the tong operating mechanism 64 and the blowheads 65) and vertical side portions (which carry the wheels 67, 67) has its side portions connected by respective links 68, 68 to a pair of external levers 70, 70 mounted on a cross shaft 72. The levers 70, 70 and the cross shaft 72 are shown more particularly in FIG. 8 which is a perspective view. In this Figure it is also shown that cross shaft 72 has mounted thereon, for rotation with the cross shaft 72, a jaw 74 engaging a projection 76 which projects from the side of a gear 78 in a direction parallel to the axis of rotation of the gear 78, but substantially displaced from that axis.

Figure 8:
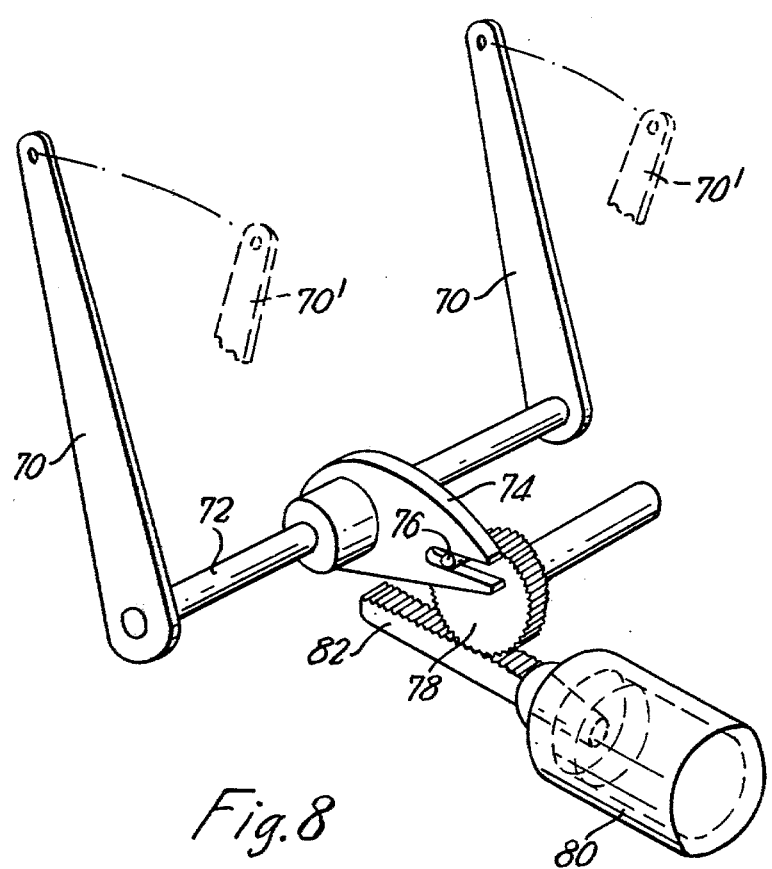
FIG. 8 illustrates the actuating means of the second transfer means of FIGS. 5 to 7.

A piston and cylinder device 80 is provided, the piston of which carries a rack 82 for engaging with the gear 78 to impart a rotary motion to the gear 78 and thence to the cross shaft 72 (through the projection 76 and the jaws 74) with the result that the external levers 70 are rocked between the positions shown in full lines in FIGS. 5 and 8 and the positions shown at 70' in dashed lines in those Figures. The mechanism described for moving the transfer carriage 61 imparts a motion to the carriage which approximates to simple harmonic motion thus minimising inertia forces on the glass.

The operations of the apparatus of FIGS. 1 to 4 and FIGS. 1, 2 and 5 to 8 respectively for the formation of an article of glassware from a gob of molten glass involve the use of essentially the same process cycle for the machine section. This process cycle will now be described with reference to FIGS. 9 and 10 in which the cycle is set out in terms of a 360° cycle, although the operations of the machine functions will be performed under the control of an electronic timing system, for example that described in U.K. Pat. No. 1,441,099 and the cycle times in degrees will be converted into appropriate data form for storage in a memory.

Figure 9:
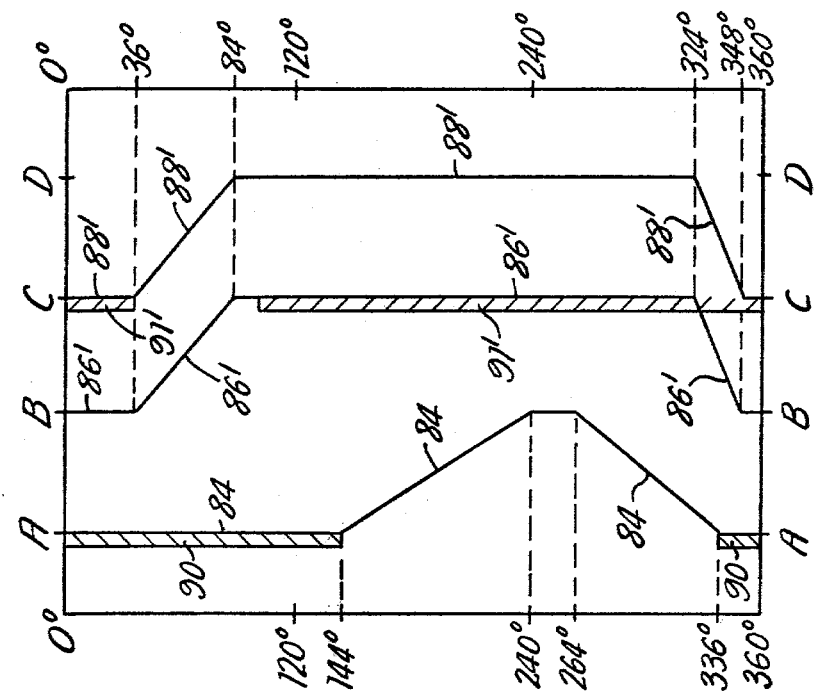
FIG. 9 is a schematic breakdown of the process cycle in accordance with the present invention performed using the apparatus of either FIGS. 1 to 4 or FIGS. 1, 2 and 5 to 8.
Figure 10:
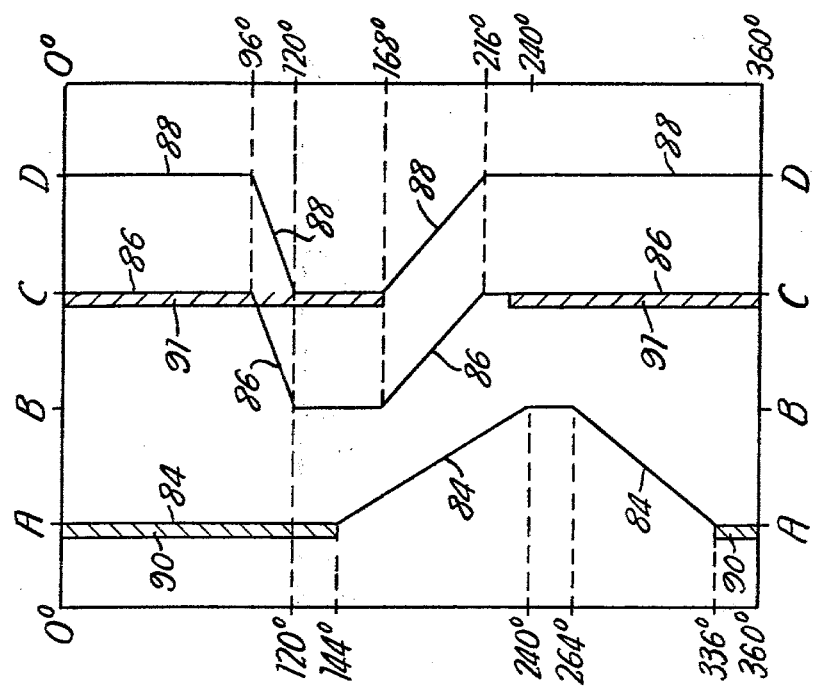
FIG. 10 is a schematic breakdown similar to FIG. 9 showing the manner in which the reheat time may be varied without effecting an alteration of the relative timing of the machine functions which comprise the primary cycle or the relative timing of the machine functions which comprise the secondary cycle.

In both FIGS. 9 and 10 the stations A, B and C are designated by the respective letters A, B and C and the deadplate 12 is designated by the letter D. In FIG. 9 the positions of the neck rings 18, 18, the first take-out tongs 44 or 62, and the second take-out tongs 45 or 63 are denoted by the lines 84, 86 and 88 respectively. The positions of these three means for holding, respectively, parisons, further formed parisons, and shaped articles of glassware which are designated by the lines 84, 86 and 88 respectively in FIG. 9 exemplify one process cycle only, and FIG. 10 is another example of a process cycle in which the movement of the second transfer means carrying the first and second take-out tongs occurs at a different time relative to the movement of the neck rings.

Referring to FIG. 9 gobs of molten glass are loaded to blank moulds at station A, which may be either the split or solid type, at the time represented by 0° in the process cycle. At this time the neck rings 18, 18 are located at station A (as represented by line 84) so that the neck rings 18, 18 of the first transfer means 16 constitute parts of the respective blank moulds 15, 15. The parisons are then formed at station A in the inverted position by either a "blowing" or "pressing" process essentially identical with the process of forming parisons in a conventional I.S. machine. As represented in FIG. 9 the formation of the parisons, followed by the opening of the blank moulds, takes place from 0° to 144° of the process cycle of the machine section. At 144° in the process cycle the neck rings 18, 18 of the first transfer means 16 commence to move from station A and deliver the parisons in an upright position at station B at 240° in the process cycle.

The support jaws 25, 25 at station B are caused to close during a period extending from 228° (just before the neck rings of the first transfer means reach their rest or second position at station B) to 252° so that the support jaws are in position to hold the parisons as these are released by the neck rings of the first transfer means, the neck rings being caused to open during the period from 240° to 264° in the process cycle. Once the neck rings are fully open the first transfer means operates to revert the neck rings from station B to station A. During this revert movement the neck rings are caused to close. As indicated in FIG. 9, the closed neck rings of the first transfer means are positioned at station A at 336° in the process cycle ready for the blank mould to be positioned to co-operate with the neck ring structures, and for other machine functions (including positioning of funnels on the blank moulds) to be performed preparatory to the receipt of the next pair of gobs of molten glass at 360° which equals 0° in the next process cycle of the machine section.

Accordingly, the group or sequence of machine functions involved in parison formation at station A all take place within the portion of machine cycle extending from 336° at the end of one cycle, to 144° in the succeeding cycle, as represented by the cross-hatched area 90 in FIG. 9. The group of machine functions performed within the period denoted by the area 90 is the primary cycle.

The parisons are supported by the jaws at station B and permitted to reheat (with or without any further manipulation, as mentioned previously) until after the arrival at station B of the first gripping means of the second transfer means. As denoted by line 86, the first gripping means arrives at its first position at station B at 120° in each process cycle of the machine section and therefore arrives at station B at 120° in the process cycle which succeeds the process cycle in which the parison was formed. Since the first and second gripping means are both moved by the actuating means of the second transfer means, the second gripping means simultaneously arrives at station C at 120° in each process cycle. During the period from 120° to 144° the tongs which are the first gripping means are caused to close, and the jaws at station B are then caused to open during the period from 144° to 168° so that, at the time denoted by 168°, the parisons are supported at station B by the first gripping means. During the same period of time, 120° to 168°, at station C the take-out tongs which are the second gripping means are first caused to close, and then the blank moulds are caused to open so that the shaped articles of glassware at station C are supported by the take-out tongs at the time denoted by 168° in the process cycle. The opening of the blank moulds conveniently commences at 144° and finishes at 168°.

Both the first and second gripping means are moved from their respective first positions to their respective second positions during a period from 168° to 216° in the process cycle so that the first gripping means delivers the further formed parisons to station C at 216°, and the second gripping means simultaneously arrives over the deadplate with articles of glassware.

At station C the tongs which are the first gripping means are opened during a period from 216° to 240°, and the blow moulds at station C are closed to grip the further formed parisons during a period from 228° to 252°. Simultaneously with the closing of the blow moulds, blowheads are brought down to engage the necks of the parisons in the blow moulds, and the articles of glassware are then blown in the blow moulds. Once the blow is completed, at 72° in the next process cycle, the blowheads are lifted from the necks of the articles of glassware during a period from 72° to 96°. At 96° the first and second gripping means commence movement from their respective second positions to their respective first positions where they arrive at 120° in each process cycle, as already described. Immediately prior to this movement of the second gripping means, the take-out tongs which constitute the second gripping means are opened during a period from 72° to 96° of the process cycle in order to deposit the articles of glassware on the deadplate. Accordingly the articles of glassware have been suspended over the deadplate during a period from 216° in one process cycle of the machine section to 96° in the succeeding process cycle, which allows time for substantial cooling of the articles before their bases are made to support the weights of the articles.

The process cycle of the machine section exemplified in FIG. 9 provides for the parisons to be located at station B for a period of time extending from 240° in one process cycle to 168° in the next process cycle so that the parisons are located at station B for a period of time equal to 288° in all.

The group or sequence of machine functions performed at station C in connection with the formation of the articles of glassware from the parisons commences at 228° in one process cycle, when the blow moulds start to close, and is terminated at 168° in the succeeding process cycle which is the time by which the blow moulds are fully open. Accordingly, this group or sequence of machine functions, which is designated herein as the secondary cycle, extends over a period of 300° which is shown in FIG. 9 by the cross-hatched area 91.

The apparatus of FIGS. 1 to 4 or FIGS. 1, 2 and 5 to 8 may be controlled to operate in accordance with an alternative process cycle of the machine section as illustrated in FIG. 10. The process cycle illustrated in FIG. 10 is identical with that of FIG. 9 as regards the timing of the primary cycle which comprises the group of machine functions making up the parison formation stage designated by the cross-hatched area 90 of the process cycle, and the movement of the neck rings between their first and second positions as represented by line 84. However, the time of operation of the first and second gripping means is altered so that the first gripping means is moved from its second position at station C to its first position at station B during the period of the process cycle 324° to 348°. At this same period of the cycle the second gripping means is moved from its second position over the deadplate to its first position at station C.

During the period from 348° in one process cycle of the machine section to 12° in the succeeding process cycle of the machine section the tongs which are the second gripping means are caused to close and the support jaws at station B are caused to open during the period from 12° to 36°. Therefore, at the time denoted by 36° in the process cycle of the machine section illustrated in FIG. 10, the parisons are supported at station B by the tongs which are the first gripping means. During this same period of time 348° to 36° at station C the take-out tongs which are the second gripping means are first caused to close and then the blow moulds are caused to open so that the formed articles of glassware at station C are supported by the take-out tongs at the time denoted by 36° in the process cycle.

During the period from 36° to 84° in the process cycle illustrated in FIG. 10 the first and second gripping means are caused to move from their respective first positions to their respective second positions so that the first gripping means delivers the further formed parisons to station C at 84°, and the second gripping means simultaneously comes to rest holding the articles of glassware over the deadplate. The times taken to effect the movements of the first and second gripping means from their respective first positions to their respective second positions are identical with the times taken for similar movements in the process cycle of FIG. 9, but occur at different times in the cycle relative to the primary cycle 90 and the movements of the neck rings. The movements of the first and second gripping means are denoted in FIG. 10 by the lines 86' and 88' respectively.

Following the arrival of the first and second gripping means in their respective second positions the following machine functions take place at station C and the deadplate as indicated below:

| Time | Station C | Deadplate |
|---|---|---|
| 84° to 108° | First gripping means open | |
| 96° to 120° | Blow moulds close and blowheads on | |
| 300° to 324° | Blowheads off | Second gripping means open |

It will be seen therefore that the group or sequence of machine functions performed by the apparatus of station C in connection with the formation of articles of glassware from the parisons commences at 96° in one process cycle when the blow moulds start to close and terminates at 36° in the succeeding process cycle which is the time at which the blow moulds are again fully open. This group or sequence of machine functions making up the secondary cycle designated by reference numeral 91' in FIG. 10 extends over a period of 300° and is therefore identical in length with the secondary cycle of FIG. 9. The difference between the process cycles of FIGS. 9 and 10 therefore lies in the time for which the parisons are located at station B. In the process cycle of FIG. 10 this is the period extending from 240° in one process cycle to 36° in the succeeding process cycle i.e. a period of time equal to 156°.

Accordingly, as compared with the process cycle of machine functions in FIG. 9, FIG. 10 illustrates a process in which the parison reheat time is shortened by 132° without any change in the durations of either the primary cycle 90 or the secondary cycle 91'. The whole group of machine functions comprising the secondary cycle have been advanced relative to the end of the primary cycle in the process cycle illustrated in FIG. 10 as compared with the process cycle illustrated in FIG. 9.

Similarly, the change in reheating time in the process cycle in FIG. 10, as compared with the process cycle of FIG. 9, has not changed the deadplate hanging time which is the same in both the illustrated process cycles, at 240°.

Therefore, modification of an existing I.S. machine such as that exemplified in U.S. Pat. No. 1,911,119 to convert the blow station into a reheat station B, and to add an additional station C as the blow station, with consequential movement of the deadplate and conveyor further from the blank station to which the gobs of molten glass are delivered, provides substantial improvements in the flexibility of the parison reheat time, without adversely affecting the deadplate hanging time or either the primary or secondary cycles. It will be well understood that the parison reheat time includes, additionally to the time for which the parison is supported at station B, the times during which the parison is being moved from station A to station B, and from station B to station C, time at station A after the blank mould sections have been removed from contact with the surfaces of the parisons, optionally time at station A after the blank moulds are fully open, and also time at station C before the application of the blow or other pressure difference for final shaping of the articles of glassware. Preferably, the final shaping of the articles of glassware is effected primarily by application of reduced pressure to the interior of the blow moulds with simultaneous application of a blow to the interior of the parisons to assist in the final shaping and to extract heat from the interior of the glass.

It will be appreciated that the process cycles described above are purely for example and are not representative of any preferred process. However, the proportion of the cycle employed in parison formation is designed to be more appropriate for a "press and blow" process than a "blow and blow" process.

Referring now to FIGS. 11 and 12 of the accompanying drawings, there are shown side and plan views of a second embodiment of apparatus according to the present invention and comprising an individual section of a glassware forming machine having a frame 10 within which there are three operating stations provided in spaced apart relationship along the longitudinal centre line of the section. The three stations are designated in FIG. 11 as stations A, B and C similarly to the three stations of the apparatus of FIGS. 1 and 2.

Conveniently, the detailed apparatus located permanently at each of stations A, B and C is the same as the apparatus located permanently at the stations designated A, B and C in our aforementioned U.K. Pat. No. 1,491,859, except that at station B there are provided support jaws similar to the support jaws 25, 25 of the first embodiment of the present invention in shape and including shrouds 37, 37. However, the support jaws 25, 25 of this second embodiment of the present invention are preferably actuated by an in-line mechanism as described in U.K. Pat. No. 1,491,859 rather than by the pivoting movement in which the support jaws 25, 25 of the first embodiment are actuated.

However, in accordance with the present invention the glassware forming machine section illustrated in FIGS. 11 and 12 differs essentially from the machine section of the said U.K. Patent in the provision of independent transfer carriages 92 and 93 instead of a single transfer carriage. As shown in the side view which is FIG. 11 of the accompanying drawings there are provided separate guide means 94 and 95 for the respective transfer carriages 92 and 93. In the plan view which is FIG. 12 it is shown that the guide means 95 is constituted by a pair of guide rails (both of which are designated as 95) and a similar pair of guide rails constituting the guide means 94 is provided immediately beneath the guide rails constituting the guide means 95. Transfer carriage 92 includes members embracing the pair of guide rails constituting the guide means 94, and similarly transfer carriage 93 includes members embracing the guide rails which constitute the guide means 95.

Although separate guide means 94 and 95 are provided in the second embodiment of the present invention as illustrated, apparatus in accordance with this second embodiment may be constructed to have both transfer carriages 92 and 93 operating on a single guide means, preferably constituted by a pair of guide rails or rods.

Transfer carriage 92 is a neck ring carriage which carries the neck ring structure including neck rings 18, 18 and operating mechanism therefor. In this second embodiment of the present invention the first transfer means is constituted by the transfer carriage 92, the guide means 94, and piston and cylinder devices 97, the pistons 98 of which embrace the guide rails constituting the guide means 94. (Only one of the piston and cylinder devices 97 is visible in FIG. 11 and neither is visible in FIG. 12 because the piston and cylinder devices 97 are located directly below similar piston and cylinder devices 99, 99 constituting the actuating means of the second transfer means of this embodiment of the present invention). The piston and cylinder devices 97 constitute actuating means for reciprocating the transfer carriage 92 between a first position at station A and a second position at station B, the transfer carriage 92 being mounted to the pistons 98 of the piston and cylinder devices 97.

As shown in FIG. 11 the transfer carriage 92 includes neck ring carriage extension tubes 96 extending beyond the neck ring carriage in a direction away from the piston and cylinder devices 97, the neck ring carriage extension tubes 96 embracing the guide rails constituting the guide means 94. The neck ring carriage extension tubes 96 are provided for feeding operating air to open or close the neck rings 18, 18 as described in our co-pending U.S. Patent Application Ser. No. 019,052 filed Mar. 9, 1979, but the provision of such neck ring carriage extension tubes 96 forms no part of the present invention.

In this second embodiment of the present invention the second transfer means is constituted by the guide means 95, actuating means comprising the piston and cylinder devices 99, 99, the pistons 100, 100 of which embrace the guide rails constituting the guide means 95, and the second transfer carriage 93 which carries first and second gripping means being, respectively, first take-out tongs 101, 101 and second take-out tongs 102, 102. The transfer carriage 93 is movable between a second position as illustrated in FIGS. 11 and 12, where the first take-out tongs 101, 101 are at station C and the second take-out tongs 102, 102 are over the deadplate 12, and a first position, where the first take-out tongs 101, 101 are at station B and the second take-out tongs 102, 102 are at station C.

The transfer carriage 93 advantageously has the first take-out tongs 101, 101 formed as part of a combined blowhead and tong structure incorporating blowheads 103, 103. This is possible because in accordance with the operation of apparatus in accordance with this present invention, the transfer carriage 93 spends the majority of each process cycle of the machine section in its second position. The combined blowhead and tong structure may, for example be essentially as described with reference to FIG. 6 of the aforementioned U.S. Pat. No. 1,491,859.

Alternatively to the use of a combined blowhead and tong structure on the transfer carriage 93 of the second transfer means, the blowhead may be formed as a separate structure permanently situated at station C.

Also, the specific forms of second transfer means described with reference to either FIGS. 3 and 4 or FIGS. 5 to 8 may be utilised in the second embodiment of the invention in which the parison is formed in an upright position at the first station. Similarly the form of second transfer means described with reference to FIGS. 11 and 12 may be used in the first embodiment of the invention in which the parison is formed in an inverted position at the first station.

Examples of the operations of the machine section illustrated in FIGS. 11 and 12 to produce articles of glassware by the press and blow process will now be given.

The first example will be given by reference to Table A and FIG. 13 of the accompanying drawings, and the second example by reference to Table B and FIG. 14 of the accompanying drawings.

Figure 13:
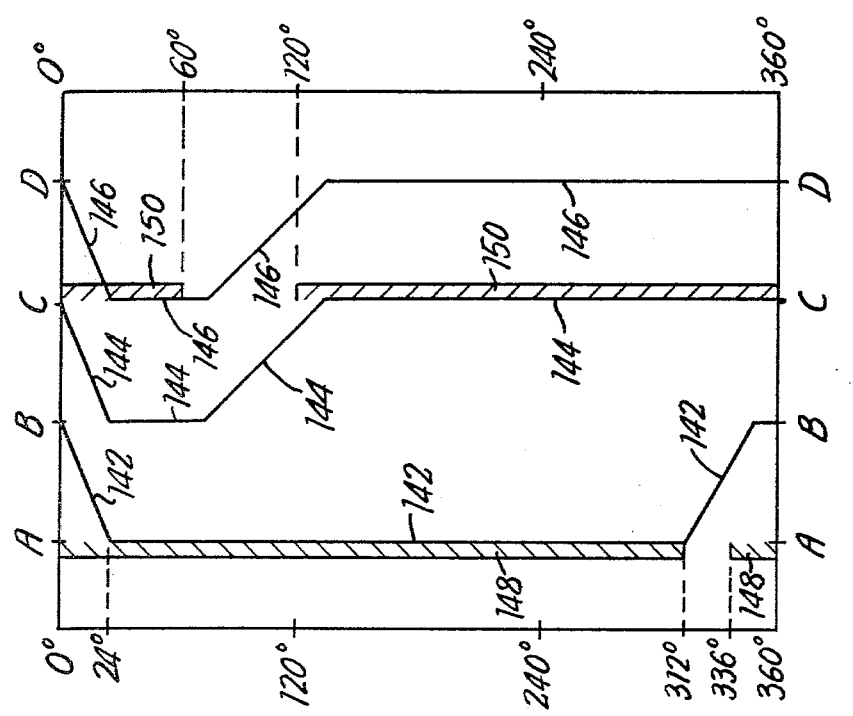
FIG. 13 is a schematic breakdown of the process cycle in accordance with the present invention performed using the apparatus of FIGS. 11 and 12.

There now follows a chart of one example of a step by step operation of manufacture of glassware by the "press and blow" process by the machine section of FIG. 13 in Table A.

TABLE A

| Time | STATION A | STATION B | STATION C | DEADPLATE |
|---|---|---|---|---|
| 0° | Load gobs | | | |
| 0°–24° | | ←Neck rings | ←First tongs | ←Second tongs |
| 24°–36° | | | First tongs lower | Second tongs close |
| 24°–48° | Inter moulds close | | | |
| 36°–48° | | | First tongs close | |
| 36°–60° | | | | Moulds open |
| 48°–72° | | Support jaws open | | |
| 48°–84° | Plungers down | | | |
| 60°–72° | | | | Second tongs up |
| 72°–132° | | | First tongs → | Second tongs → |
| 120°–144° | | | | Moulds close |
| 132°–144° | | | First tongs open | |
| 240°–264° | Plungers up | | | |
| 264°–288° | Inter moulds open | | | |
| 288°–312° | Body moulds down | | | |
| 312°–348° | | Neck rings → | | |
| 336°–348° | | | Support jaws close | |
| 336°–360° | Body moulds up | | | |
| 348°–360° | | Neck rings open | Blowheads up | Second tongs open |

The movements of the neck rings and the first and second tongs illustrated in Table A are shown in FIG. 13 by the lines 142, 144 and 146 respectively.

The neck rings 18, 18, are advantageously caused to close while the neck ring carriage 92 is being moved from its second position at station B to its first position at station A during the period from 0° to 24° in the process cycle of the machine section. Also the blowheads are lowered into engagement with the parisons during the movement of the transfer carriage 93 from its first position at station A to its second position at station B.

The sequence of operations set out in Table A shows that the parison is being pressed at station A during the period from 84° to 240°. The whole group or sequence reheating of a parison takes place, and a third station including a blow mold for finally shaping an article of glassware, and independently operable first and second transfer means, the first transfer means including a neck ring structure and actuatig means for moving the neck ring structure from a first position in which the neck ring structure engages a parison in the blank mold at the first station to a second position in which the neck ring structure releases a parison at the second station and returning the neck ring structure from the second position to the first position prior to the formation of the next parison in the blank mold at the first station, and the second transfer means including gripping means and actuating means for moving the gripping means between a first positon in which the gripping means engaging a parison at the second station and a second position in which the gripping means holds the parison in such a location at the third station that the blow mold at the third station can close around the parison.

6. A glassware forming machine section according to claim 5 wherein the first transfer means includes an arm arranged to be pivoted about an axis, a neck ring structure for engaging a parison in an inverted position at the first station in the first position of the neck ring structure, and actuating means for causing the arm to rotate about the axis such that the neck ring structure presents a parison held thereby in an upright position at the second station in the second position of the said neck ring structure, and for causing the arm to rotate in the reverse direction to return the neck ring structure to the said first position.

7. A glassware forming machine section according to claim 5 wherein the first transfer means includes: horizontal guide means extending over at least the first station, a carriage slidable on the guide means, the said carriage supporting the neck ring structure, and means for reciprocating the carriage relative to the guide means between first and second positions corresponding to the first and second positions of the neck ring structure.

8. A glassware forming machine section according to claim 5 wherein the second transfer means includes: horizontal guide means extending over at least the third station, a carriage slidable on the said guide means, the said carriage supporting the gripping means, and means for reciprocating the carriage of the second transfer means relative to the guide means between the first and second positions of the said gripping means.

9. A glassware forming machine section according to claim 8 wherein the second transfer means further includes a blowhead mechanism mounted on the carriage of the second transfer means and means for moving the blowhead mechanism relative to the finish of a parison held by the gripping means.

10. A glassware forming machine section according to claim 8 wherein the means for reciprocating the carriage of the second transfer means relative to the guide means comprises a pair of levers mounted on a rotatable shaft, a pair of members each connecting one of the levers to the carriage, and means for rotating the shaft through an angle sufficient to rock the pair of levers between positions in which the levers, through the said members, cause the carriage to be located in positions corresponding to the first and second positions of the said gripping means.

11. A glassware forming machine section according to claim 5 wherein the second transfer means includes a rotatable shaft, an arm mounted for rotation with the shaft, gripping means pivotally supported on the arm, and actuating means for rotating the shaft to move the arm between positions corresponding to the first and second positions of the gripping means.

12. An individual section of a multiple section glassware forming machine including three operating stations spaced apart longitudinally of the section which comprises: at the first station, means including a blank mold for forming a parison in an inverted position from a gob of molten glass delivered to the blank mold at the first station; at the second station, means which is movable to engage and support the parison for further forming and to disengage and release the further formed parison; at the third station, means including a blow mold for finally shaping an article of glassware from the further formed parison; first transfer means including a neck ring structure and actuating means for moving the neck ring structure from a position in which the neck ring structure engages the inverted parison at the first station to a position in which the neck ring structure presents the parison in an upright position at the second station where the parison is released, and returning the neck ring structure to the first station prior to the formation of the next parison at the first station; and second transfer means operable independently of the first transfer means, which second transfer means includes actuating means and first and second gripping means which are movable simultaneously between first and second positions by the second transfer actuating means, the first gripping means transferring the further formed parison from the second station to the third station while maintaining the further formed parison in an upright position, and the second gripping means transferring the shaped article from the third station to a takeout position beyond the third station.

13. A glassware forming machine section according to claim 12 wherein the actuating means of the second transfer means causes the first and second gripping means to be moved simultaneously between their respective first and second positions in an arcuate movement.

14. A glassware forming machine section according to claim 12 wherein the actuating means of the second transfer means causes the first and second gripping means to be moved between their respective first and second positions in a straight line movement.

15. An individual section of a multiple section glassware forming machine which comprises means defining three operating stations spaced apart longitudinally of the section which are respectively, a first station including an upright top-opening blank mold for forming a parison, a second station including means which is movable to engage and support the parison during reheating thereof at the second station and to disengage and release the parison, and a third station including a blow mold for finally shaping an article of glassware from the further formed parison, first transfer means comprising horizontal guide means, a carriage movable on the horizontal guide means, first actuating means for moving the carriage relative to the horizontal guide means between first and second positions, and a neck ring structure supported on the carriage for forming part of the top-opening blank mold at the first station in the first position of the carriage and movable to release a parison at the second station in the second position of the carriage and to return to said first position prior to the formation of the next parison at the first station, and second transfer means operable independently of the first transfer means, the second transfer means including first and second gripping means and second actuating means for simultaneously moving the first and second gripping means between first positions, in which the first gripping means engages a further formed parison at the second station and the second gripping means engages an article of glassware at the third station, and second positions, in which the first gripping means supports the further formed parison at the third station and the second gripping means supports the shaped article at a takeout position beyond the third station.

16. A glassware forming machine section according to claim 15 wherein the second transfer means includes horizontal guide means extending over at least part of the second and third stations and a take-out position beyond the third station, and a second carriage movable on the last mentioned horizontal guide means and supporting the first and second gripping means.

17. A glassware forming machine section according to claim 16 in which the horizontal guide means of the first transfer means comprises a first pair of guide elements, and the horizontal guide means of the second transfer means comprises a second pair of guide elements.

18. A glassware forming machine section according to claim 17 in which each of the said pairs of guide elements comprises a pair of guide rails.

19. A glassware forming machine section according to claim 16 in which the horizontal guide means of the first transfer means and the horizontal guide means of the second transfer means are constituted by a single pair of guide elements.

20. A glassware forming machine section according to claim 19 in which the guide elements are guide rails.

21. A glassware forming machine section according to claim 15 wherein the second transfer means is operable to move the first and second gripping means between their respective first and second positions in an arcuate movement.

22. An individual section of a multiple section glassware forming machine which comprises three operation stations spaced apart longitudinally of the section, apparatus for performing a predetermined series of machine functions which include a group of machine functions arranged in a timed relationship to one another to constitute a primary cycle in which a parison is formed in a blank mold at a first station, and a further group of machine functions arranged in a timed relationship to one another to constitute a secondary cycle in which an article of glassware is finally shaped in a blow mold at a third station, independently operable first and second transfer means, the first transfer means including a neck ring structure and actuating means for moving the neck ring structure from a first position in which the neck ring structure engages a parison in the blank mold at the first station to a second position in which the neck ring structure releases a parison at the second station, and returning the neck ring structure from the second position to the first position prior to the formation of the next parison in the blank mold at the first station, and the second transfer means including gripping means and actuating means for moving the gripping means between a first position in which the gripping means engages a parison at the second station and a second position in which the gripping means holds the parison at the third station in such a location that the blow mold at the third station can close around the parison, and means for varying the time for which the parison is supported in the second station and for simultaneously effecting a corresponding consequential change in the timing of the group of machine functions constituting one of the primary and secondary cycles relative to the other of said cycles.

23. A glassware forming machine section according to claim 22 wherein the means for varying the time for which the parison is supported in the second station and for simultaneously effecting a corresponding consequential change in the timing of the group of machine functions constituting one of the primary and secondary cycles relative to the other of said cycles includes electronic storage means storing operating data representative of the times at which each of the events in both the primary and secondary cycles are to be performed and of the times at which the first transfer means and the second transfer means are to be actuated for movement between the first and second positions of the neck ring structure and the gripping means respectively, and data representative of primary and secondary angles, means for reading the data from the storage means and determining whether the operating data for an event is associated with the primary or secondary angle, means for adding the primary or secondary angle to the operating data for said event and causing the said event to be performed as a result of a comparision with the count in a counter, and means for entering into the storage means data representative of different primary and secondary angles.

* * * * * if this is not in the condition required by the output command signal.

When the question of box 119 has been answered and appropriate action taken, if necessary, the memory control 103 passes to the next step indicated at box 120 which is a check as to whether the event number is equal to 32. If it is not, as in the case under discussion when the event number equals 2, the memory control 103 is automatically caused to reset to box 115 which results in the event number being increased and the sequence of events denoted by boxes 116, 117, 118, 119 and 120 being repeated. The memory control 103 thus checks the condition of all the events for section number 1 until the event number equals 32 when the memory control 103 passes to the question "is the section number equal to 8?" as shown in box 121. As all that has so far been done is to scan all the electronic events in section 1, the answer to the question of box 121 is "no" and memory control 103 therefore takes the loop 123 which results in the section number being increased by one in the step at box 124. The memory control 103 will then investigate section number 2 starting with event number 1 and repeating for section number 2 the process already described for section number 1. When this sequence has been repeated for all the sections, the section number will equal 8, which will signify the end of the core scan (box 125) and the memory control 103 will then move back to the start of the sequence at box 110 which requires it to wait until the receipt of another pulse indicates that the counter 102 has again been incremented by one.

Referring again to FIG. 15 there is shown a manual data entry means 127, for example a keyboard, which enables changes to be entered into the memory 104 under control of the memory control 103. When the reheat time is to be changed without changing the relative timings of any of the events in either the primary or the secondary cycle, this may be done through the manual data entry means 127 which utilises data entry and status display control means 128 into which a new figure for either the primary or the secondary angle is recorded, displayed on status display 129 for checking, and then entered into the memory 104 to be stored as event 1 of the appropriate section. The entry of the new count for either the primary or the secondary angle into the memory 104 is effected under control of the memory control 103 at an appropriate time in the operation of the particular section, so as not to affect adversely any glassware forming cycle performed in the particular section. Conveniently, the new primary angle or secondary angle will be entered into the memory 104 at a time after the finish of one primary or secondary cycle and before the commencement of another such cycle. Then the next time that that particular primary or secondary cycle is commenced the whole cycle will have been advanced or retarded relative to either the secondary or the primary cycle by an amount corresponding to the change in the primary or secondary angle entered into the memory 104.

In practice variation in the reheat time will usually be achieved by varying the secondary angle stored in the memory 104 for the particular machine section. Adjustment of the primary angle by a small amount may be made for obtaining the optimum time for loading of a gob to the machine section, and such adjustment could be utilised to effect a small change in reheat time in appropriate circumstances.

In addition to the basic groups of events or machine functions which are performed at station A and station C and which together make up respectively the primary cycle or the secondary cycle as hereinbefore defined, other events in the operation of a machine section are associated with either the primary or secondary angle. The timing of the operation of the first transfer means will be linked to the events of the primary cycle and therefore the primary angle will be added to the signals representative of the first transfer out and first transfer return. Similarly, the operation of the second transfer means will be linked to the events of the secondary cycle so that the stored counts for operation of the second transfer means and the first and second gripping means will have the secondary angle added to them.

The operation of the support jaws 25, 25 at station B, however, is linked to the change in the reheat time which is effected by the movement of either or both of the primary and secondary cycles. The closing of the support jaws 25, 25 must be effected in co-ordination with the movement of the first transfer means and must therefore be effected at a count stored as a primary event associated with the primary angle of the primary cycle. Similarly, the opening of the support jaws 25, 25 must be linked to the operation of the second transfer means and therefore the opening of the support jaws 25, 25, must be effected as a secondary event by a signal linked to the secondary angle which controls the events of the secondary cycle.

Figure 15:
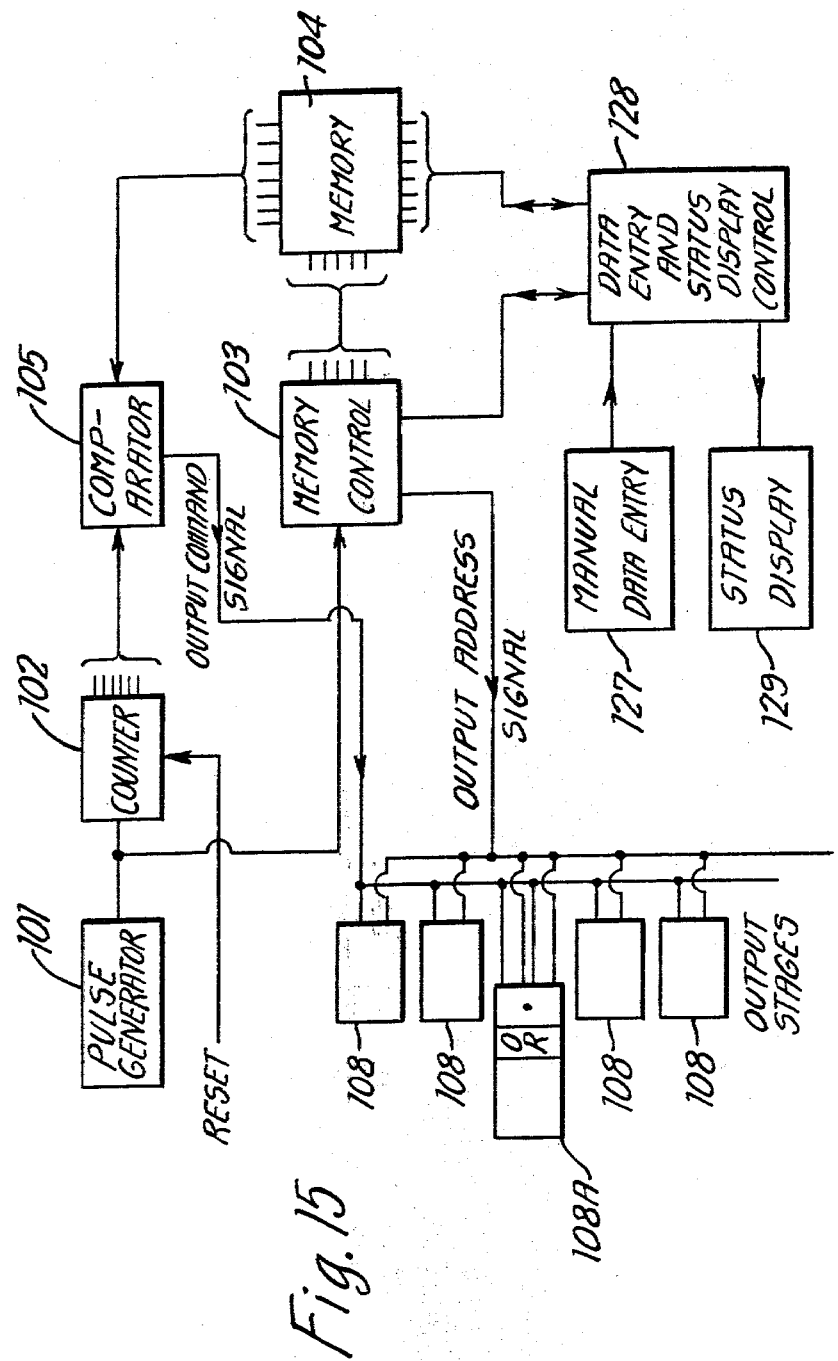
FIG. 15 is a block diagram of a system for operating a process in accordance with the present invention and as exemplified in FIGS. 9 and 10, and FIGS. 13 and 14 respectively.
Figure 16:
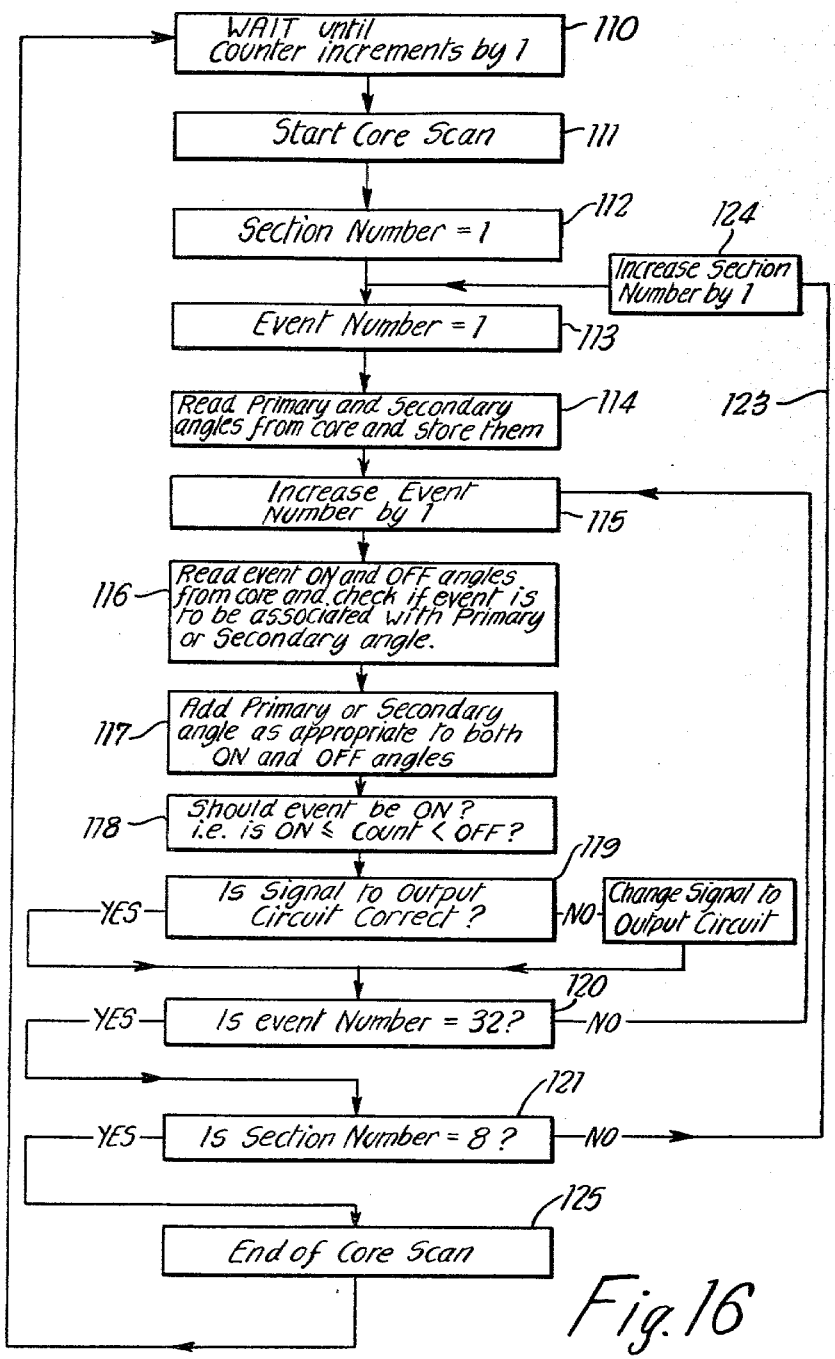
FIG. 16 is a logic sequence diagram showing the steps performed in carrying out the process in accordance with the present invention.

However, in operation of the system as described with reference to FIG. 15 the condition of each event is checked at each count and it is therefore essential that an event ON angle corresponding to the condition "support jaws 25, 25 close" be given on the occurrence of every pulse received by the counter from the time when the support jaws 25, 25 close under the control of a primary event ON angle for the support jaws 25, 25 until the time when the support jaws 25, 25 open under the control of a secondary event which is an event OFF angle for the support jaws 25, 25. This is achieved by providing event ON and event OFF angles for the support jaws 25, 25 as both primary events and secondary events. The secondary event ON angle for support jaws 25, 25 must always occur before the primary event OFF angle for those support jaws. The actuation of the support jaws 25, 25, is effected by a special output stage 108A which includes an OR gate connected to receive event ON signals in response to the two commands recorded in the memory 104 as a primary event and a secondary event, respectively.

Figure 17:
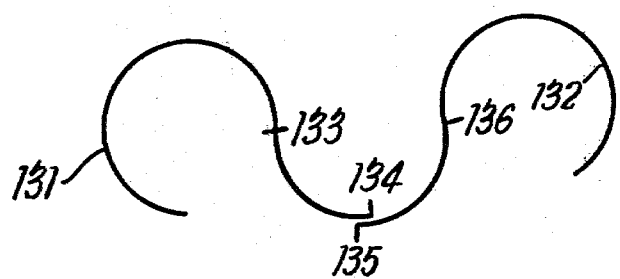
FIGS. 17 and 18 show diagrammatically the manner in which the operation of support jaws in the second station are controlled in accordance with the system of FIGS. 15 and 16.
Figure 18:
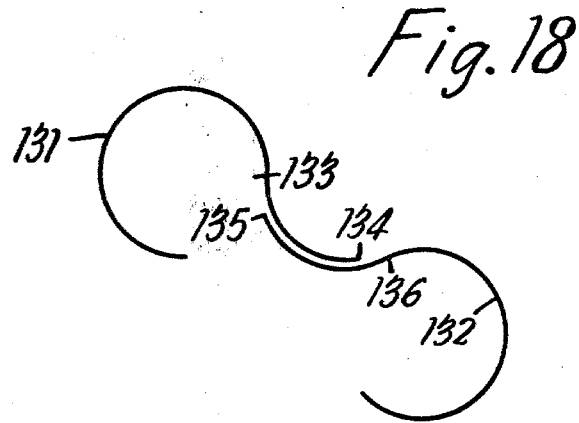

The effect of this arrangement is illustrated in FIGS. 17 and 18 which both show primary events by a line 131 and secondary events by a line 132. As already indicated, the primary events include the primary cycle, the actuation of the first transfer, and event ON and OFF angles 133 and 134 for the support jaws 25, 25. The secondary events on line 132 commence with an event ON angle 135 for support jaws 25, 25 and also include an event OFF angle 136 for support jaws 25, 25.

FIG. 17 shows the relative positions of the event ON and OFF angles for the support jaws 25, 25 giving a near-maximum reheat time at station B, while FIG. 18 shows the relative positions of the event ON and OFF angles for the support jaws 25, 25 for a substantially shorter reheat time at station B, the shortening of the reheat time being represented by the extra extent of overlap of the lines 131 and 132 in FIG. 18 as compared with FIG. 17.

It will be appreciated that the support jaws 25, 25 are kept closed by an event ON signal in FIG. 17 derived from the primary cycle through the OR gate of output stage 108A until a time denoted by point 135 in FIGS. 17 and 18 after which there are two ON signals supplied to the OR gate of output stage 108A until a time denoted by point 134 is passed. It is only when the count reaches the time denoted by point 136, which is on the secondary cycle, that there ceases to be an ON signal supplied to one or other of the inputs to the OR gate of output stage 108A, and the solenoid controlling support jaws 25, 25 is de-energised so that these jaws open and the second transfer means is able to transfer the parison to station C for final shaping of the article of glassware.

Apparatus as hereinbefore described in accordance with the present invention enables the positions of the first and second transfer means to be selected independently of one another. Accordingly, the first transfer means is enabled to spend the majority of its time in its first position (i.e. at station A), while the second transfer spends the majority of its time in its second position (i.e. at station C and the deadplate) thus providing deadplate hanging time.

Apparatus in accordance with the present invention may be utilised to produce a particular bottle at a speed substantially faster than the same bottle can be produced by the conventional I.S. machine, on account of the increased variability of reheat time which gives greater flexibility also in parison design and in reduction of the amount of glass utilised in making the bottle. However, the embodiments of glassware forming machine sections hereinbefore described with reference to FIGS. 1 to 8 provide for increased rates of production as compared with the conventional I.S. machine because they enable all the reheat of the parisons to take place outside the blow moulds.

The apparatus which has been described with reference to FIGS. 1 to 8 of the accompanying drawings, and particularly as illustrated in FIGS. 1 and 2, provides for modification of a conventional I.S. machine by conversion of the conventional blow station into a reheating station B and the addition of a new blow station (essentially as illustrated in FIG. 8 of our U.K. Pat. No. 1,491,859) with consequential displacement of the deadplate 12 and conveyor 14 to the positions shown in those Figures. The basic I.S. section frame 11 remains and the new blow station has its own separate frame 13. Accordingly the first embodiment of the present invention described herein provides the improvement over the conventional I.S. machine of the provision of more reheating time without producing an adverse change in either the blowing time or the rate of production of articles of glassware, whilst utilising a substantial proportion of the apparatus of the conventional I.S. machine. I.S. machines which are already in use by makers of articles of glassware may thus be converted and modified to provide the three station machine with independent transfers from the first station to the second station and the second station to the third station as hereinbefore described with reference to FIGS. 1 to 8 of the accompanying drawings, with the advantages resulting therefrom.

The second transfer means described with reference to FIGS. 4 to 8 of the accompanying drawings provides for a particularly smooth transfer of the reheated parisons from station B to station C. This smooth transfer is because the movement of the second transfer carriage 61 is a motion which avoids fierce acceleration forces, particularly as compared with a straightline reciprocating motion under the direct action of a piston and cylinder actuating means. Consequently the second transfer means causes the glass of the reheated parisons to be subjected to reduced inertia forces, thereby avoiding excessive swinging of the parisons during transfer from station B to station C and producing a better distribution of glass in the final article of glassware.

The first embodiment of the present invention provides a substantial advantage over the conventional I.S. machine in the ability to remove at station B cullet which results from malformed parisons. Such cullet is thus prevented from entering the blow moulds and the said first embodiment is therefore more suitable for use with fully automatic control systems.

I claim:

1. A process of forming glassware from a gob of molten glass in an individual section of a multiple section glassware forming machine, which section has three stations spaced apart longitudinally of the section, wherein a primary cycle comprising the machine functions for forming a parison from the gob of molten glass is performed in the first of said stations, a secondary cycle comprising the machine functions for finally shaping an article of glassware in a blow mold is performed at the third of said stations, the parison is moved from the station to the second station by a first transfer means, the first transfer means releases the parison at the second station and the transfer means returns to the first station prior to the time the next parison is formed at the first station, the parison is subsequently moved from the second station to the third station by a second transfer means operable independently of the first transfer means, and the period elapsing between the time at which the first transfer means brings the parison to the second station and the time at which the second transfer means removes the parison from the second station to the third station is adjustable, thereby enabling the time during which the parison reheats after its formation in the primary cycle and before the formation of the article of glassware in the secondary cycle to be adjusted without altering the relative timing of any of the machine functions comprising the primary cycle or the relative timing of any of the machine functions comprising the secondary cycle.

2. A process according to claim 1 wherein the primary cycle comprises a group of machine functions for forming the parison from the gob of molten glass in the first of said stations in an inverted position and wherein the first transfer means inverts the parison during movement of the parison from the first station to the second station thereby presenting the parison at the second station in an upright position.

3. A process according to claim 1 wherein the primary cycle comprises a group of machine functions for forming the parison from the gob of molten glass in an upright position by pressing the parison in a parison mould.

4. A process according to claim 1 wherein the article of glassware is moved from the third station to a takeout position by the second transfer means simultaneously with the movement of the parison from the second station to the third station.

5. An individual section of a multiple section glassware forming machine which comprises three operating stations spaced apart longitudinally of the section and which are, respectively, a first station including a blank mold for forming a parison, a second station in which

UNITED STATES PATENT AND TRADEMARK OFFICE
CERTIFICATE OF CORRECTION

PATENT NO. : 4,255,179
DATED : March 10, 1981
INVENTOR(S) : Thomas V. Foster

Figure 14:
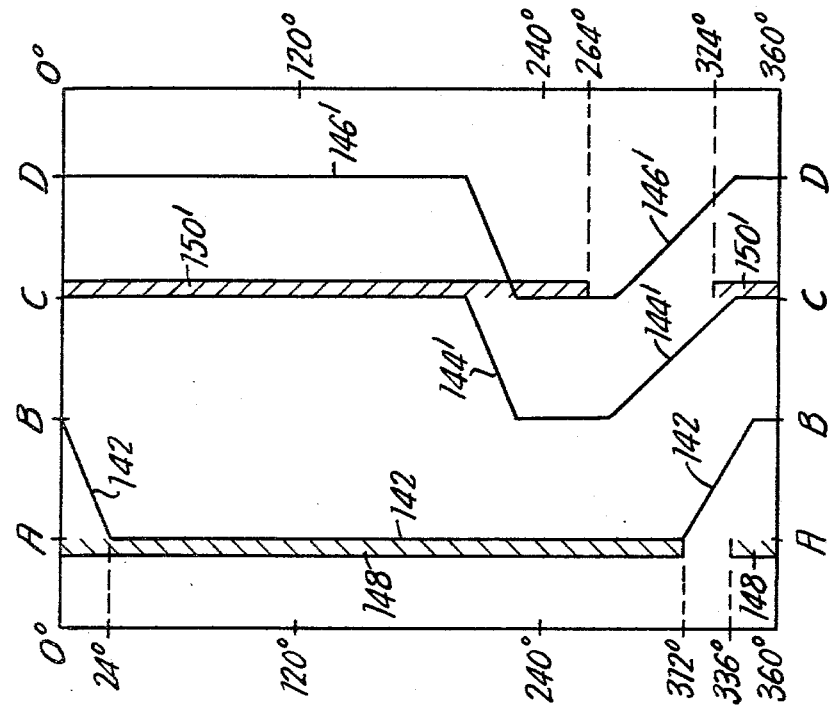
FIG. 14 is a schematic breakdown similar to FIG. 13, showing the manner in which the reheat time may be varied without effecting any alteration of the relative timing of the machine functions which comprise the primary cycle or the relative timing of the machine functions which comprise the secondary cycle.

It is certified that error appears in the above—identified patent and that said Letters Patent is hereby corrected as shown below:

Col. 5, line 60 - "an" should read --any--
Col. 6, line 3 - a new paragraph should begin at "Fig. 14"
Col. 6, line 32 - "these sections" should read --these stations--
Col. 7, line 30 - "causes" should read --cause--
Col. 9, line 37 - "plate" should read --plane--
Col. 16, line 1 - delete "U. S."
Col. 20, line 42 - " "should the event be?. " should read --"should the event be ON?".--
Col. 24, line 27 - after "the" first occurrence insert --first--
Col. 25, line 5 - "actuatig" should read --actuating--
Col. 25, line 15 - "positon" should read --position--
Col. 25, lines 15 & 16 - "engaging" should read --engages--

Signed and Sealed this

First Day of September 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,255,179
DATED : March 10, 1981
INVENTOR(S) : Thomas V. Foster

It is certified that error appears in the above—identified patent and that said Letters Patent is hereby corrected as shown below:

Col. 5, line 60 - "an" should read --any--
Col. 6, line 3 - a new paragraph should begin at "Fig. 14"
Col. 6, line 32 - "these sections" should read --these stations--
Col. 7, line 30 - "causes" should read --cause--
Col. 9, line 37 - "plate" should read --plane--
Col. 16, line 1 - delete "U. S."
Col. 20, line 42 - " "should the event be?. " should read --"should the event be ON?".--
Col. 24, line 27 - after "the" first occurrence insert --first--
Col. 25, line 5 - "actuatig" should read --actuating--
Col. 25, line 15 - "positon" should read --position--
Col. 25, lines 15 & 16 - "engaging" should read --engages--

Signed and Sealed this

First Day of September 1981

[SEAL]

Attest:

GERALD J. MOSSINGHOFF

Attesting Officer

Commissioner of Patents and Trademarks